US006622153B1

United States Patent
Lee et al.

(12) United States Patent
(10) Patent No.: US 6,622,153 B1
(45) Date of Patent: Sep. 16, 2003

(54) VIRTUAL PARALLEL MULTIPLIER-ACCUMULATOR

(75) Inventors: Hyun Lee, Allentown, PA (US); Shaun P. Whalen, Wescosville, PA (US)

(73) Assignee: Agere Systems, Inc., Berkeley Heights, NJ (US)

( * ) Notice: Subject to any disclaimer, the term of this patent is extended or adjusted under 35 U.S.C. 154(b) by 0 days.

(21) Appl. No.: 09/348,447

(22) Filed: Jul. 7, 1999

(51) Int. Cl.[7] .................................................. G06F 7/38
(52) U.S. Cl. ....................................................... 708/523
(58) Field of Search ................................. 708/523, 620, 708/625–632

(56) References Cited

U.S. PATENT DOCUMENTS 4,769,780 A * 9/1988 Chang .......................... 708/629
6,223,196 B1 * 4/2001 Hattori et al. ............... 708/523

* cited by examiner

*Primary Examiner*—Tan V. Mai
(74) *Attorney, Agent, or Firm*—Stroock & Stroock & Lavan LLP

(57) ABSTRACT

A virtual parallel multiplier-accumulator (VMAC) that can execute more than or less than one MAC operation in a single system clock cycle. The inventive VMAC advantageously employs a resource/time-sharing methodology with multiple sequential computational stages.

18 Claims, 9 Drawing Sheets

VIRTUAL PARALLEL MULTIPLIER-ACCUMULATOR

FIELD OF THE INVENTION

The present invention is directed to a multiplier-accumulator (MAC) and more particularly, to a virtual parallel multiplier-accumulator (VMAC) that processes more than or less than one MAC operations within a single system clock cycle.

BACKGROUND OF INVENTION

A multiply-accumulate (MAC) operation is a common operation performed in signal processing and other algorithms. Because of its frequency of occurrence in such algorithms, many prior art microprocessor and digital signal processors (DSPs) include some form of direct instruction support for the multiply-accumulate operation. Typically, the CPU's instruction set includes a multiply-accumulate instruction or multiply and add instructions that, together, can execute a MAC operation in a single system clock cycle. These instructions are executed by hardware circuits such as separate multiplier and adder circuits, or a combined multiply-add circuit.

Algorithms that use MAC operations typically consist of a loop over many iterations. The algorithm's performance can be improved by executing the MAC operations of multiple loop iterations at once. This property has motivated CPU designers to include instructions that execute multiple MAC operations per system clock cycle. An instruction executing multiple MAC operations per system clock cycle may be implemented in a number of ways. For example, hardware may be provided to execute multiple MAC operations per cycle consisting of a number of multipliers and adders or a number of multiply-add circuits. By providing multiple arithmetic circuits, the CPU can execute the simultaneous multiplies and adds needed to support multiple MAC operations in parallel.

Microprocessor integrated circuits may include a plurality of multiplier-accumulator (MAC) units connected in parallel with each other. While this configuration provides the ability to perform multiple MAC operations within a single system clock cycle, it also consumes more real estate within the integrated circuit, and adversely affects the performance and power consumption of the integrated circuit due to the relatively long bus connections between multi-port memories, registers, and the multiple MAC units.

An example of a prior art CPU data path executing two MAC operations per cycle is depicted in FIG. 1. Each MAC unit defines a data path which consists of a register file comprised of sixteen, 40-bit registers, each having a multiplier and a load/store/arithmetic unit attached thereto. The multipliers each multiply two 16-bit operands to produce a 32-bit product. The multipliers can accept a new operand and produce a new product every system clock cycle, but have a latency of two system clock cycles. The load/store/arithmetic units can perform a 40-bit accumulate (i.e., addition/subtraction) in a single system clock cycle. The multiple MAC units are identical to each other, and provide an effective throughput of two multiply-accumulates per system clock cycle. Performing a complete multiply-accumulate operation requires passing the operands through a multiplier by issuing a multiply instruction, and then through a load/store/arithmetic unit by issuing an add instruction. The multiply and add instructions are scheduled for execution so that the product of the multiply operation is not used by the add operation until the multiplier has finished generating the product.

A prior art dual MAC data path is depicted in FIG. 1, and a timing diagram for that MAC is depicted in FIG. 2. The timing diagram depicted in FIG. 2 represents the timing for one of the components of the data path of FIG. 1, with the timing diagram for the other component of the data path being substantially similar. In operation, the first two multiply operands are read from a register file (REG FILE A) during Cycle 1 on signal lines DI_M1S1 and DI_M1S2. The values of these first operands are determined by the data stored at the corresponding register addresses, e.g., register file A source 1 (REGS1A-1) and register file A source 2 (REGS2A-1). These first operands are communicated to multiplier M1, which begins a multiply operation on the two operands. In Cycle 2, a second set of operands is read from the register file (REGS1A-2 and REGIS2A-2) and communicated to the multiplier M1, which beings a multiply operation. At the same time, the multiplier M1 finishes its multiply operation on the first operands and generates a first output product PROD1-1 which is output on signal line PS_M1D. The first output product is communicated to register file A at the end of cycle 2. During Cycle 3, the first product that was generated, PROD1-1, is read from register file A on signal line PS_L1S1 and communicated to the load store arithmetic unit L1 as a first operand. The second operand to be accumulated by L1 is the value denoted ACC1-1 and is read from register file A on signal line PS_L1S2. The sum of the accumulation operation performed by L1 on PROD1-1 and ACC1-1, designated as SUM1-1, is written to register file A at the end of Cycle 3 over signal line RA_L1D. Also, during this cycle, a second product PROD1-2 is generated by the multiplier M1 and written to register file A. Similarly, third operands are read from register file A (REGS1A-3 and REGS2A-3) and communicated to the multiplier M1, which begins a multiply operation on the third operands. During cycles 4, 5 and 6, successive products are accumulated by L1 and additional products are generated by M1. When finished, the two mirror components of the prior art MAC data path have each accumulated the sum of an independent sequence of products. If the sum of those two sequences is needed, an additional accumulation instruction is issued to add the two sums.

It is common in CPU designs to increase the CPU clock frequency by processing instruction execution in a pipeline. The flow of instructions and their operands and results through the pipeline is controlled by the CPU's pipeline control logic. For CPUs that do not support a MAC operation, the duration of a pipeline stage (and therefore the clock frequency) is typically determined by the adder circuit or the delay to access memory. For CPUs that support MAC operations, the duration of a pipeline stage is often determined by the multiplier/adder/multiply-add circuit, i.e. by the hardware provided to perform the MAC operation. To overcome this limitation, prior art CPUs extend the pipeline by pipelining the multiplier/adder/multiply-add arithmetic circuits. Although the arithmetic circuits are pipelined with a fixed number of stages, pipelining still introduces significant complexity both in the design of the pipeline control logic and in writing a sequence of instructions to handle the latency of the pipeline. Ideally, the MAC operation should be executed with an arithmetic circuit that does not constrain the CPU's clock frequency and does not introduce complex latencies for the programmer to manage.

The prior art dual MAC data path has a number of disadvantages. Firstly, two multipliers and two adders are required. Secondly, the clock frequency of the dual MAC data path is restricted by the multiplier's delay; the multiplier already being pipelined once in an attempt to deal with its impact on the system frequency. However, this pipeline then requires extra circuit area, power and latency if the product is immediately re-used in a subsequent multiplication. Finally, the prior art dual MAC data path does not produce a single sum of all four products and the data-path has to be partitioned into mirror components to reduce the pressure on register file ports and bus loading. However, this means that the data path does not directly sum a sequence of products in half the number of cycles, and an additional cycle is needed to add the final sums.

It is desirable to provide a MAC unit that overcomes the shortcomings of the prior art.

SUMMARY OF THE INVENTION

The present invention is directed to a virtual parallel multiplier-accumulator (VMAC) that can process N MAC operations within M system clock cycles, where N may or may not be equal to M and where a MAC operation is generally defined by the equation $(x)*(y)+(z)$. The present invention also reduces the physical size of integrated circuits and electronic devices since one VMAC constructed in accordance with the present invention replaces N prior art MAC units.

The VMAC of the present invention consists of a Control-Wave Generator (CWG) and a Sequential-Computational-Stage MAC (SCS-MAC) comprised of a plurality of sequentially (i.e., serially) arranged computational stages. The CWG produces multiple sets of consecutive control signals within a single VMAC clock (VMCK) cycle, and with each rising edge of VMCK. The frequency of the VMCK may be different from or the same as the system or main clock (MCK), as a matter of design choice. The control signals generated by the CWG control the flow of data or operands through the SCS-MAC (i.e., through the VMAC), and are also used to clock output or result registers that may be connected to the inventive VMAC. A source register may be connected to the VMAC to provide input operand data to the SCS-MAC. The SCS-MAC performs a MAC operation as the operand data propagates through each computational stage of the SCS-MAC. The output from the VMAC may be latched into an output or result register for communication to the source register of the VMAC or to another electronic device or circuit.

While, prior art MAC units accept a maximum of one set of operands per clock cycle, the VMAC of the present invention can accept a new set of operand data within a single clock cycle. In fact, the VMAC of the present invention permits many new MAC operations to start within a single clock cycle, and permits many operands to be present in the sequential computational stages, with each computational stage executing a different phase of a MAC operation (e.g., partial sums, products, etc.). Thus, the VMAC of the present invention simultaneously performs different phases of a MAC operation on different sets of operand data, and produces a MAC result per a time period which is approximately equivalent to the propagation delay through a single computational stage.

The present invention is directed to a virtual parallel multiplier-accumulator (VMAC) responsive to a VMAC clock (VMCK) derived from a master clock (MCK). The VMAC is adapted for performing more than or less than one multiplier-accumulator (MAC) operation within a MCK cycle.

The present invention is also directed to a virtual parallel multiplier-accumulator (VMAC) responsive to a VMAC clock (VMCK) derived from a master clock (MCK), where the VMAC is adapted for performing more than or less than one multiplier-accumulator (MAC) operation within a MCK cycle. The VMAC of this embodiment comprises a control-wave generator (CWG) adapted for generating a plurality of control signals within a VMCK cycle. The VMAC further comprises a sequential-computational stage MAC (SCS-MAC) adapted for receiving data from a source register and for receiving said plurality of control signals from the CWG. The SCS-MAC performs an operation on the data upon receipt of each of the plurality of control signals from the CWG.

The present invention is also directed to an integrated circuit including a virtual parallel multiplier-accumulator (VMAC) responsive to a VMAC clock (VMCK) derived from a master clock (MCK). The integrated circuit includes a VMAC that is adapted for performing more than one multiplier-accumulator (MAC) operation within a MCK cycle.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The present invention is directed to a virtual parallel multiplier-accumulator (VMAC) that could execute multiple MAC operations in a single system clock cycle. The inventive VMAC advantageously employs a resource/time-sharing methodology with multiple sequential computational stages.

Figure 1:
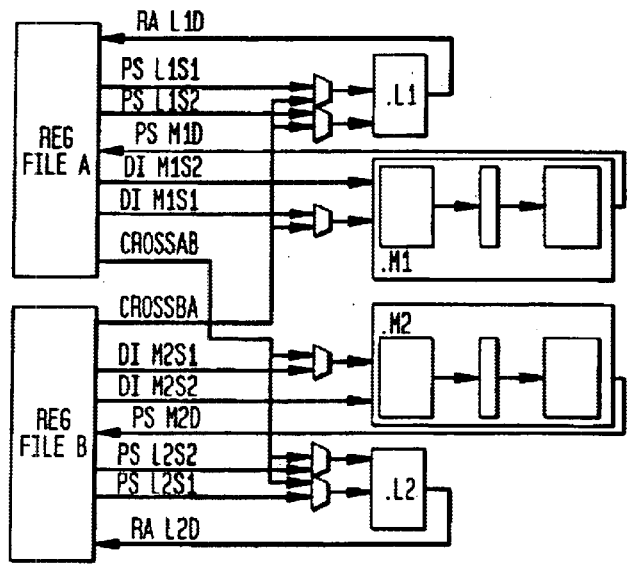
FIG. 1 is a schematic block diagram of a prior art dual multiplier-accumulator (MAC) that includes two physically identical MAC units.
Figure 2:
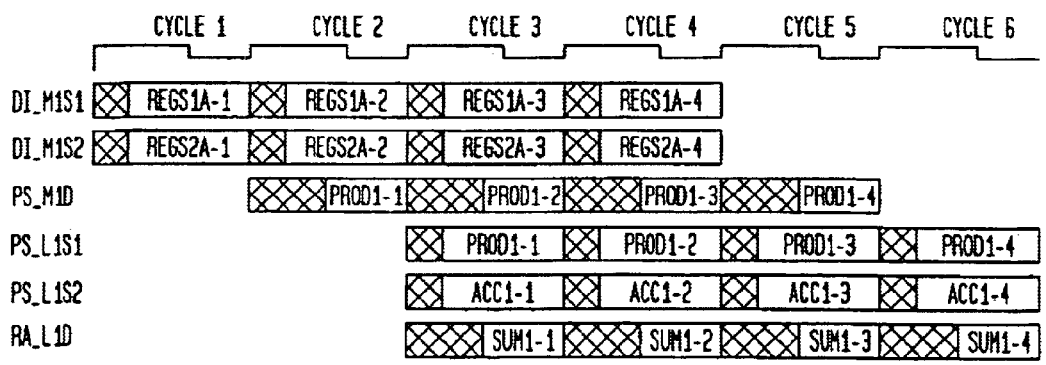
FIG. 2 is a timing diagram depicting a flow of data through one of the MAC units depicted in FIG. 1.
Figure 3:
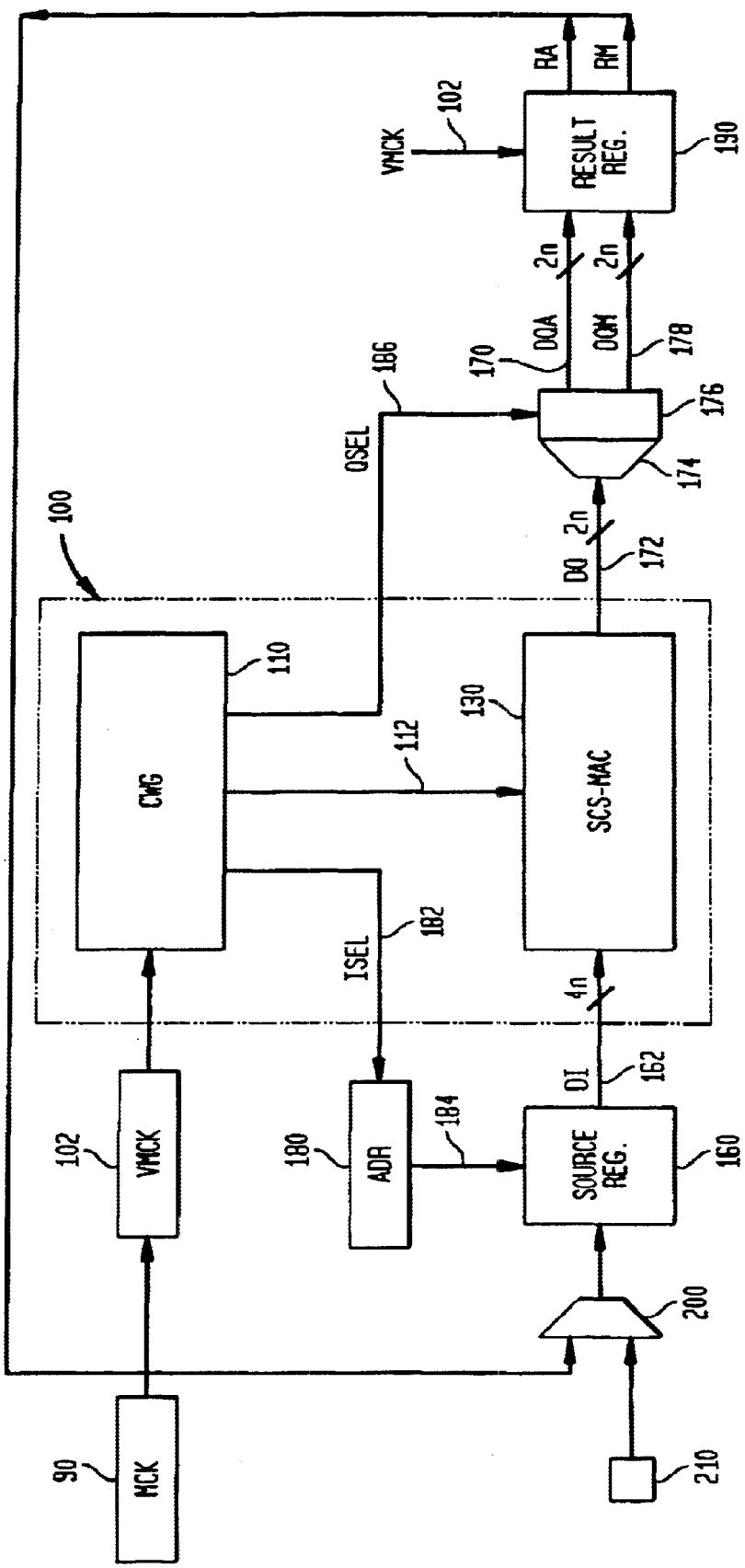
FIG. 3 is a schematic block diagram of a virtual parallel multiplier-accumulator (VMAC) connected to peripheral circuitry and constructed in accordance with the present invention.

Referring to FIG. 3, a schematic block diagram of a VMAC 100 constructed in accordance with the present invention is there depicted. The VMAC 100 includes a control wave generator (CWG) 110 that generates control signals and functions generally to control the flow of data through the VMAC 100. The terms data and operands are used interchangeably herein to generally denote digital information that is input to, processed by, and output from the VMAC 100. The CWG 110 controls the flow of data from an external data register 160 into the VMAC 100. The CWG 110 also controls the flow of data through the SCS-MAC 130, and the flow of data out of the VMAC 100. The CWG 110 thus operates as a traffic controller for ingress, processing, and egress of VMAC data such that many operands may flow into the SCS-MAC 130 from the register 160 within a single system clock cycle. The VMAC 100 also includes a sequential-computational stage MAC (SCS-MAC) 130 that performs multiply and add functions under the control of the CWG 110. The VMAC 100 may be provided as part of a conventional microprocessor integrated circuit (e.g. a central processing unit (CPU)), a digital signal processor, or, alternatively, it may comprise a separate integrated circuit that may be coupled with other integrated circuits and electronic devices.

With continued reference to FIG. 3, the VMAC 100 receives parallel data input (DI) on an input data bus 162 from an external source register 160. In a preferred embodiment, the input data bus 162 is a (4n+G)-bit wide bus which consists of x, y, and z data where x and y are n bits wide and z is (2n+G) bits wide, where G represents the number of overflow guard bits. The specific address location in the register 160 is selected by activation of an input select signal (ISEL) 182 by the CWG 110. In response to activation of ISEL 182, an address generator 180 asserts an address on address line 184 to the external register 160, which in turn presents particular data (the data present at the selected address location) on the input data bus 162. The data contained within the external register 160 may comprise data output from the VMAC 100 from previous operations, e.g., data output (RA, RM) from the result register 190, or it may comprise data provided from other data sources 210 such as, for example, other external memory (e.g., RAM, ROM, etc.) and devices (e.g., CD-ROM, fixed and removable disk-drives, etc.). Thus, the data contained within the external register 160 may comprise fixed or variable data, or a combination thereof, as a routine matter of design choice. The external register 160 is preferably buffered with enough data to ensure that enough data is available to the VMAC 100 for processing in a single system clock cycle. An interface 200 is provided at the input of the external register 160 to, inter alia, control the flow of data into the register 160.

The VMAC 100 provides time-multiplexed, serial output data (DQ) communicated over a single output data bus 172 to an output data demultiplexer 174, which demultiplexes the output data DQ and communicates the demultiplexed output data to a register 176. Data output (DQA, DQM) from the register 176 is provided on a plurality of parallel output data lines 170, 178 to a result register 190. A control signal (QSEL) 186 from the CWG 110 controls the flow of data output from the register 176. Upon receipt of a control signal QSEL, output data DQA, DQM is clocked out of the register 176 and into a result register 190. Intermediate data output from the VMAC 100 presented as data output (RA, RM) of the result register 190 is communicated back into the source register 160, where it may be utilized again by the VMAC 100.

A VMAC clock (VMCK) 102 controls the CWG 110 and is derived from a master clock (MCK). The VMCK 102 also controls the result register 190. The VMCK 102 may be the same (frequency, duty cycle, etc.) as the master clock 90, or the VMCK 102 may be different from the MCK 90, as a routine matter of design choice.

Control of the SCS-MAC 130 is provided by a control signal 112 communicated from the CWG 110. The control signal 112 (described in more detail below and with reference to FIGS. 4 and 5) controls the ingress, processing, and egress of SCS-MAC data.

Figure 4:
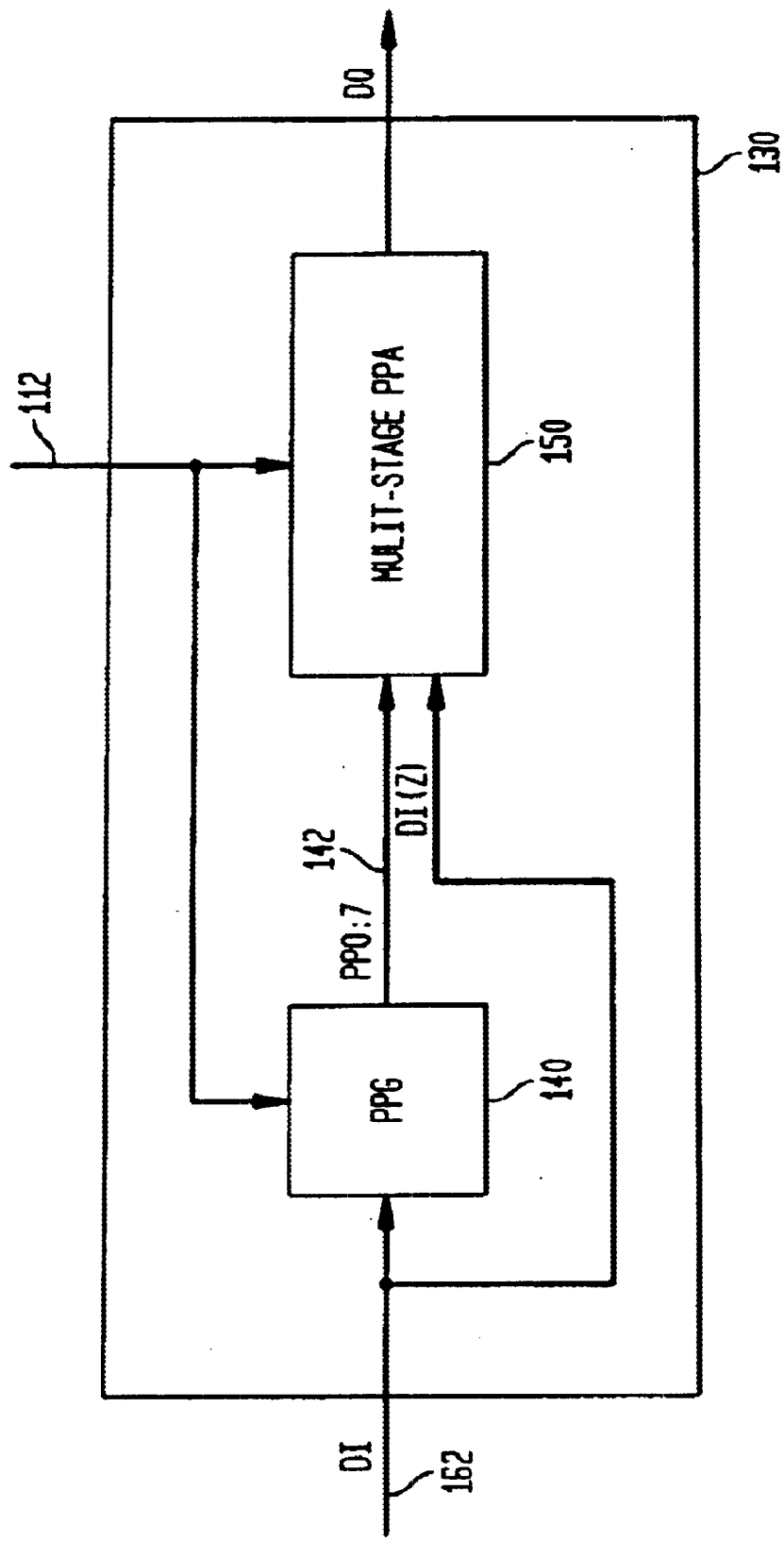
FIG. 4 is a schematic block diagram of a sequential-computational-stage multiplier-accumulator (SCS-MAC) of the VMAC of FIG. 4.
Figure 5:
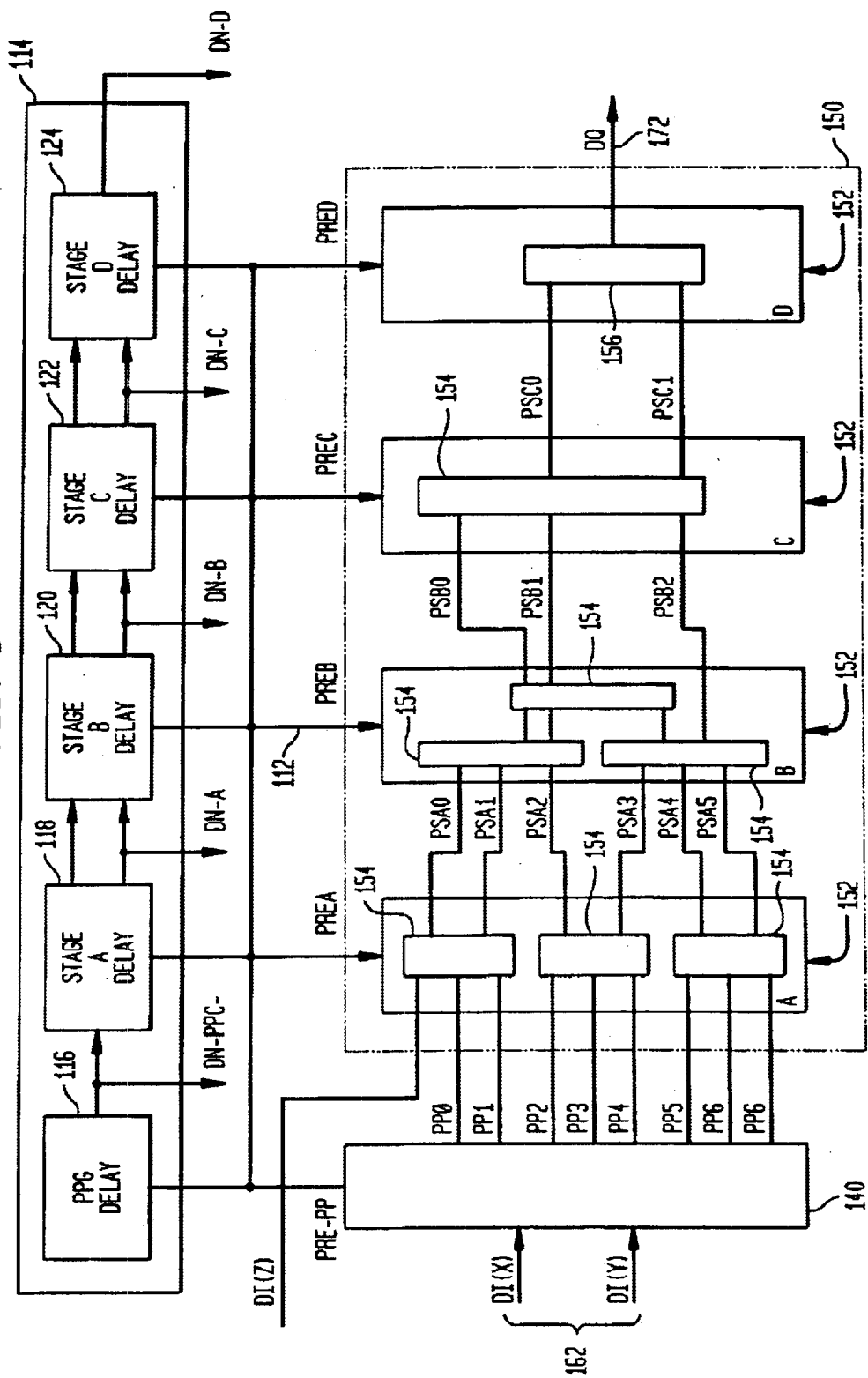
FIG. 5 is a schematic block diagram of a partial product generator (PPG), a multi-stage partial-product adder (PPA) of the SCS-MAC, and the control wave generator (CWG) of FIG. 4.

With reference next to FIGS. 4 and 5, the SCS-MAC 130 of the present invention will now be discussed in detail. The SCS-MAC 130 includes a partial-product generator (PPG) 140 that is configured as-a Booth algorithm generator. Data is input to the PPG 140 on input data bus 162 and is processed by the PPG 140 so that a plurality of partial products are presented on a plurality of output lines PP0:PP7 and communicated to a multi-stage partial-product adder (PPA) 150. The PPA 150 includes a plurality of sequential computational stages 152 (delineated as stages A-D) which may comprise dynamic carry save adder (DCSA) 154 (stages A, B and C) and dynamic carry lookahead adder (DCLA) 156 (stage D) circuits. Alternatively, static circuits may also be used in the PPA 150. In the embodiment depicted in FIG. 5, four partial sum stages are provided in the PPA 150 as an implementation of a 16×16-bit multiplier. The output of each sequential computational stage 152 comprises a partial sum of the data present at the input of each stage 152, and are delineated as PSA0:PSA5, PSB0:PSB2 and PSC0:PSC1, for stages A, B and C, respectively.

Flow of an operand (i.e., flow of data) through the SCS-MAC 130, and through the VMAC 100, of the present invention will now be discussed in detail with reference to FIGS. 5 and 6. In general, the CWG 110 generates a plurality of control signals that clock data through the VMAC 100 and ensure that the ingress of trailing data into the VMAC 100 does not corrupt leading data already being processed by the VMAC 100 prior to egress of that leading data from the VMAC 100. Control of the flow of data through the VMAC 100 by the CWG 110 is accomplished by providing a delay data path 114 in the CWG 110 that includes a plurality of delay stages 116, 118, 120, 122, 124 one for each stage of the SCS-MAC 130. Each delay stage mimics the worst-case delay through the corresponding stage of the SCS-MAC 130. Upon initiation of a MAC operation, arbitrary data is communicated along the delay data path 114 and control signals DN-PPG and DN-A, DN-B, DN-C and DN-D are generated internal to the CWG 110 as the arbitrary data passes between the delays of the delay data path 114. These controls signals generally indicate that a particular stage of the SCS-MAC 130 has completed an operation on an operand (i.e., on data). The control signals so generated are used by the CWG 110 of the present invention to control the flow of data through the SCS-MAC 130. By constructing the delay data path 114 so that each state mimics the worst-case delay through the corresponding stage of the SCS-MAC 130, the present invention ensures that trailing data entering the VMAC 100 (the SCS-MAC 130) will not corrupt or catch-up to leading data already being processed by the VMAC 100. The control signals DN-PPG and DN-A:D ensure that data flows efficiently through the VMAC 100 and further ensure that the various different data present in the various VMAC stages at any point in time do not interfere with each other.

A plurality of precharge control signals, namely PREPP, PREA, PREB, PREC and PRED, are generated by the CWG 110 and communicated to the PPG 140 and PPA 150 to control the flow of data therethrough. The relationship between and among these signals, control signals DN-PPG and DNA:D, and the flow of data through the VMAC 100 is depicted in FIG. 6. These precharge control signals are also communicated to the delays 116–124 of the delay data path 114. Initially, and as depicted by dotted line 210 in FIG. 6, all precharge control signals PREPP and PREA-PRED are at an active high state. The CWG 110 initiates a VMAC operation on the rising edge of VMCK 102 by de-activating control signal PREPP. In response, a set of operands (i.e., data) from the source register 160 are presented on the input data bus 162 and communicated to the PPG 140. At this point, control signals PREA-PRED remain activated and data will not flow into the PPA 150. Generation of a partial product PP0:7 of the input data is performed by the PPG 140 and, when complete, the rising edge of control signal DN-PPG causes the CWG 110 to de-activate control signal PREA thus permitting data to flow from the PPG 140 into the first stage (stage A) of the PPA 150. With PREA inactive, the first computational stage 152 (stage A) may produce a partial sum PSA0:5 of all partial products PP0:7 presented at its input. When the stage A computation is complete, the rising edge of control signal DN-A causes the CWG 110 to de-activate control signal PREB, thus permitting data to flow from stage A into the second computational stage. 152 (stage B) and causing stage B to produce a partial sum PSB0:2 of all partial products presented at its input, i.e., PSA0:5. At the same time, PREPP is re-activated, preventing new data (i.e., a new operand) from flowing into the PPG 140. When the stage B computation is complete, the rising edge of control signal DN-B causes the CWG 110 to de-activate control signal PREC, thus permitting data to flow from stage B into the third computational stage 152 (stage C) and causing stage C to produce a partial sum PSC0:1 of all partial products presented at its input, i.e., PSB0:2. At the same time, PREPP is de-activated, permitting new data to flow into the PPG 140, and PREA is re-activated, preventing new data from flowing into stage A. When the stage C computation is complete, the rising edge of control signal DN-C causes the CWG 110 to de-activate control signal PRED, thus permitting data to flow from stage C into the fourth computational stage 152 (stage D) and causing stage D to produce a data output DQ of the SCS-MAC 130. At the same time, PREB is re-activated, thus preventing new data from flowing into stage B. When the stage D computation is complete, the rising edge of control signal DN-D causes the CWG 110 to de-activate control signal PREC, thus preventing the flow of new data into stage C. De-activation of control signal PREPP in response to the rising edge of control signal DN-B initiates a new VMAC operation, and the re-activation and de-activation of the various control signals is accomplished as described above. Through these internal and external handshakes, the CWG 110 controls the flow of data through the SCS-MAC 130, and ultimately, through the VMAC 100.

Figure 6:
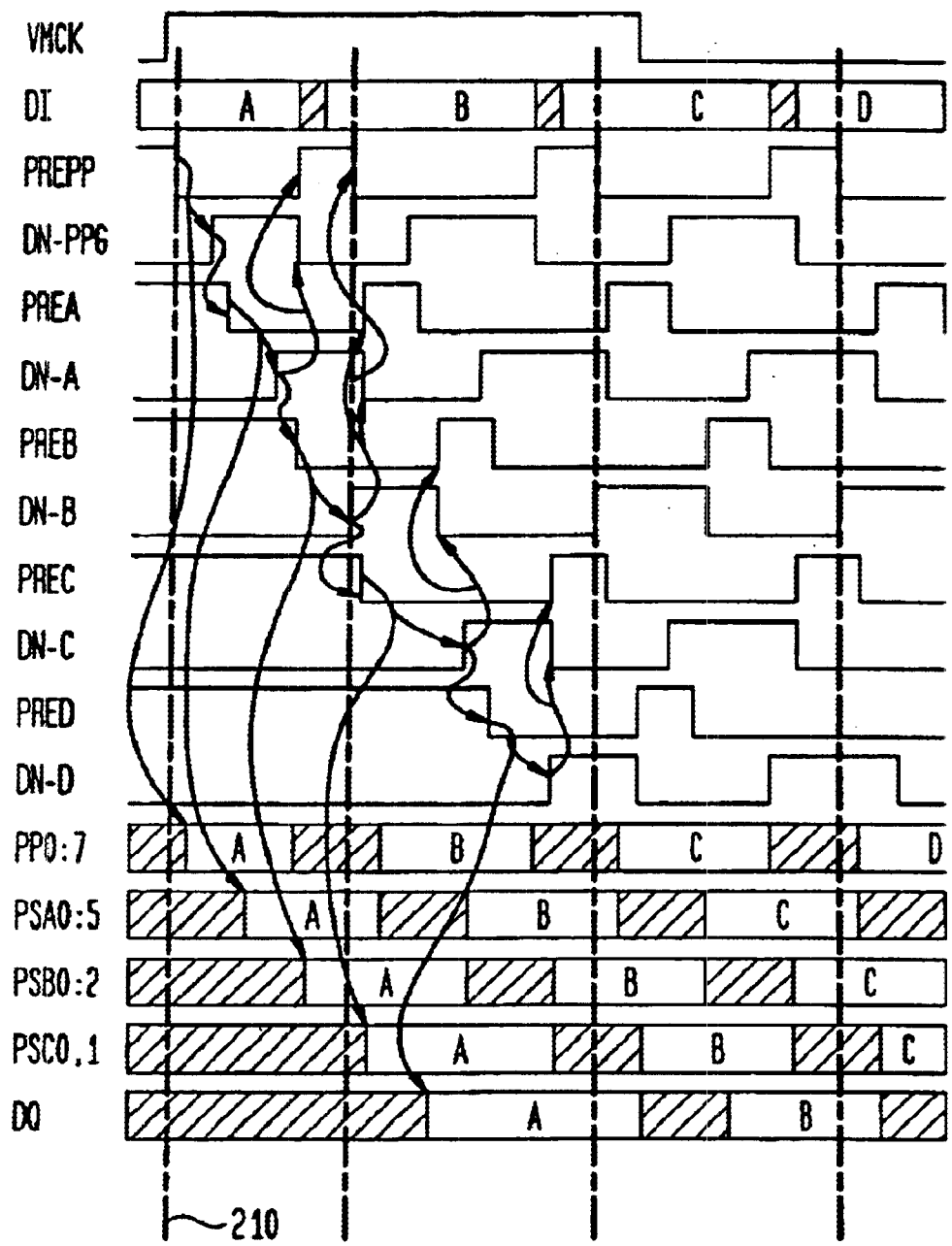
FIG. 6 is a timing diagram depicting data propagation and control signals for the PPG and PPA of FIG. 5.

The timing diagram depicted in FIG. 6 depicts a preferred embodiment of the relationship between and among the various clock, control and data signals in a VMAC 100 constructed in accordance with the present invention. It will be obvious to persons skilled in the art that various circuit configurations may provide the desired clock, control and data signal relationships. The specific circuit configuration for the VMAC 100 and its various parts (e.g., SCS-MAC 130, CWG 110) may vary according to design criteria, provided that the operation and function of the VMAC 100 is consistent with the timing diagrams depicted and discussed herein.

The VMAC 100 of the present invention is operable in various different modes, four of which are represented by the timing diagrams depicted in FIGS. 7–10.

Figure 7:
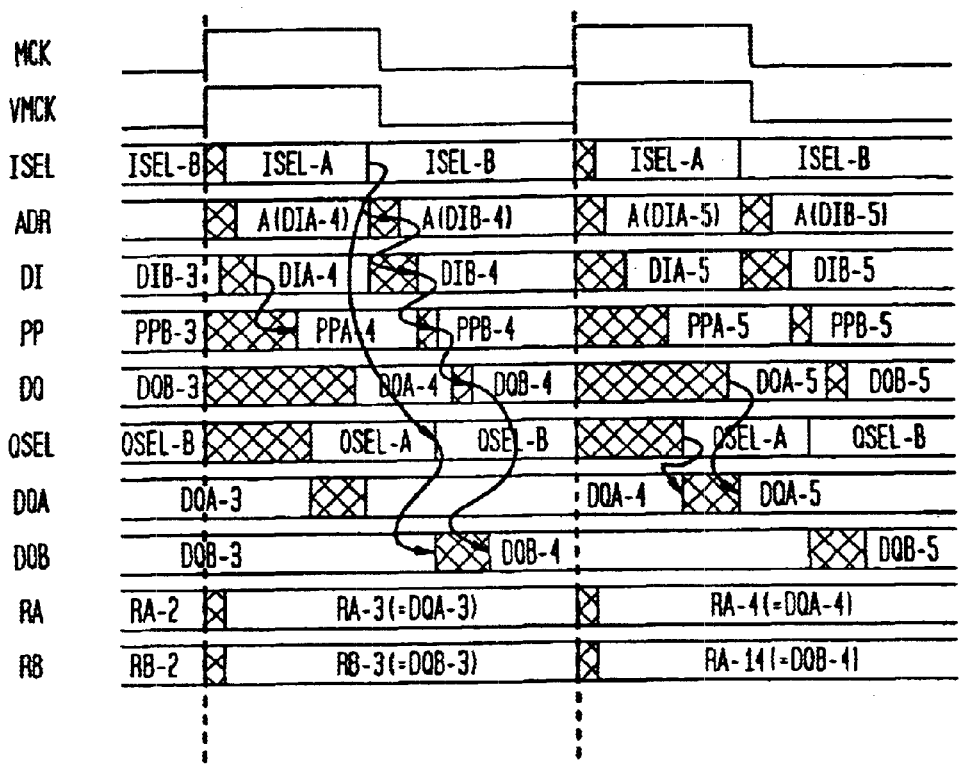
FIG. 7 is a timing diagram for a VMAC constructed in accordance with the present invention and adapted to execute two MAC operations in each system clock cycle.

The timing diagram of FIG. 7 represents operation of a VMAC 100 performing two MAC operations per VMCK cycle. In this case, the VMCK 102 is the same as the MCK 90, and the CWG 110 changes the ISEL signal 182 to cause the address generator 180 to generate two different source register read addresses serially. The source register 160 presents two sets of operands to the SCS-MAC 130 serially according to the read addresses presented to the source register 160 by the address generator 180. The change of the ISEL signal 182 from ISEL-A to ISEL-B occurs when stage A (FIG. 5) completes its computation with the first set of operands. The CWG 110 resets the ISEL signal 182 to ISEL-A with the rising edge of the VMCK 102. Within each VMCK cycle, the SCS-MAC 130 produces two results serially (i.e., serial data output) according to the input operand sets. The output data demultiplexer 174 and register 176 convert the serial data output from the SCS-MAC 130 to parallel data, and assert DQA and DQB (also identified as DQM in FIG. 3) on two sets of physically different wires. The result register 190 latches in DQA and DQB with the next rising edge of the VMCK 102, and produces the VMAC results, RA and RB, at its output. A processor with a VMAC 100 having the above timing would accomplish the same task as a processor with two parallel MACs. Thus, one VMAC 100 configured in accordance with the present invention replaces two prior art MACs.

Figure 8:
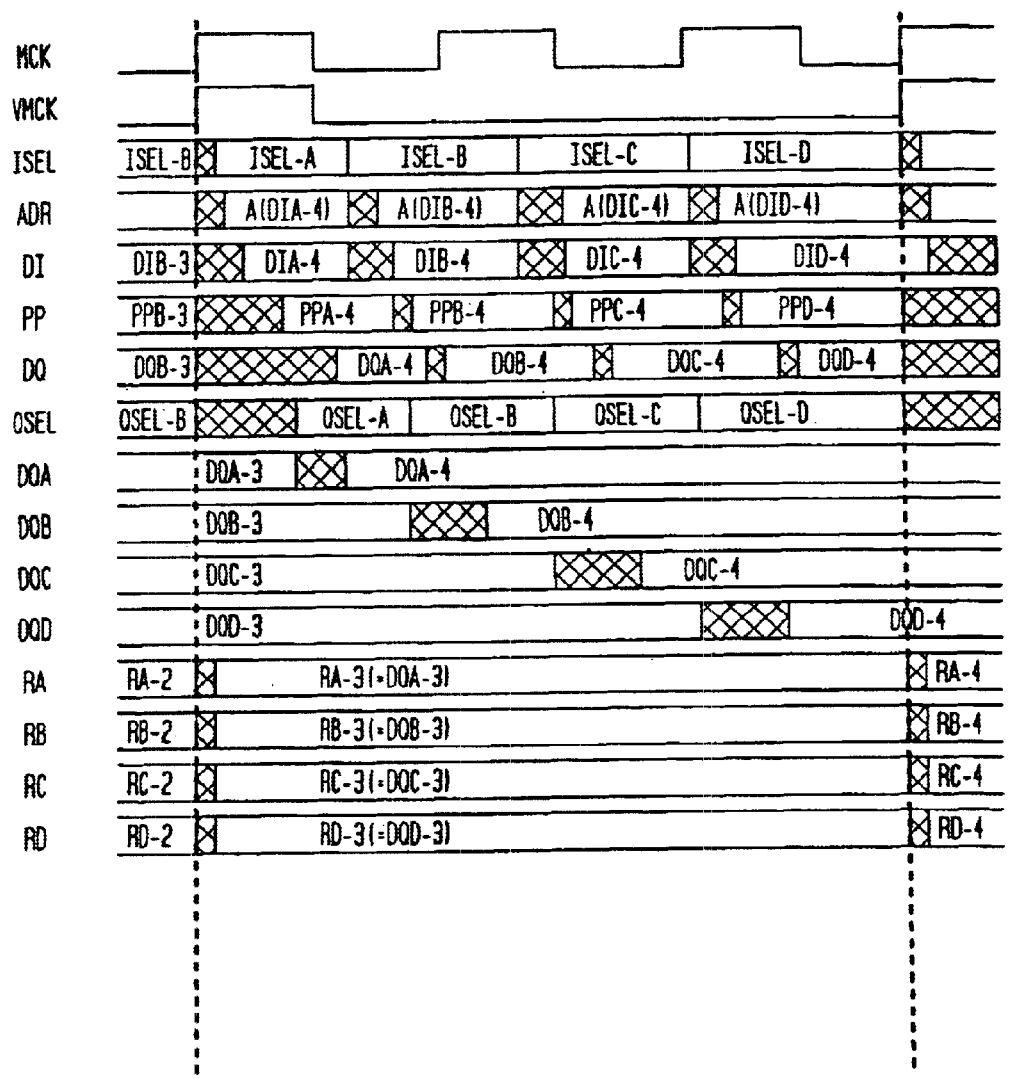
FIG. 8 is a timing diagram for a VMAC constructed in accordance with the present invention and adapted to execute four MAC operations for each three system clock cycles.

The timing diagram of FIG. 8 represents operation of a VMAC 100 performing four MAC operations per VMCK cycle (3 MCK cycles). In this case, the frequency of the VMCK 102 is one third of the frequency of the MCK 90, and the CWG 110 changes the ISEL signal 182 to cause the address generator 180 to generate four different source register read addresses serially. Since only the rising edge of the VMCK 102 is used as the VMAC 100 starting signal, the duty cycle of the VMCK 102 does not need to be 50-50. The source register 160 presents four sets of operands to the SCS-MAC 130 serially according to the read addresses presented to the source register 160 by the address generator 180. The change of the ISEL signal 182 occurs as stage A (FIG. 5) completes its task with each set of operands, and the CWG 110 resets ISEL signal 182 to ISEL-A with the rising edge of the VMCK 102. Within each VMCK cycle, the SCS-MAC 130 produces four results serially according to the input operand sets. The output data demultiplexer 174 and register 176 parallelize the serial results and assert DQA-DQD on four sets of physically different wires. The result register 190 latches in DQA-DQD with the next rising edge of VMCK 102, and produces the VMAC results RA-RD at its output. In this case, a single VMAC 100 configured in accordance with the present invention replaces four prior art MACs, and the VMAC 100 has a latency of three MCK cycles.

Figure 9:
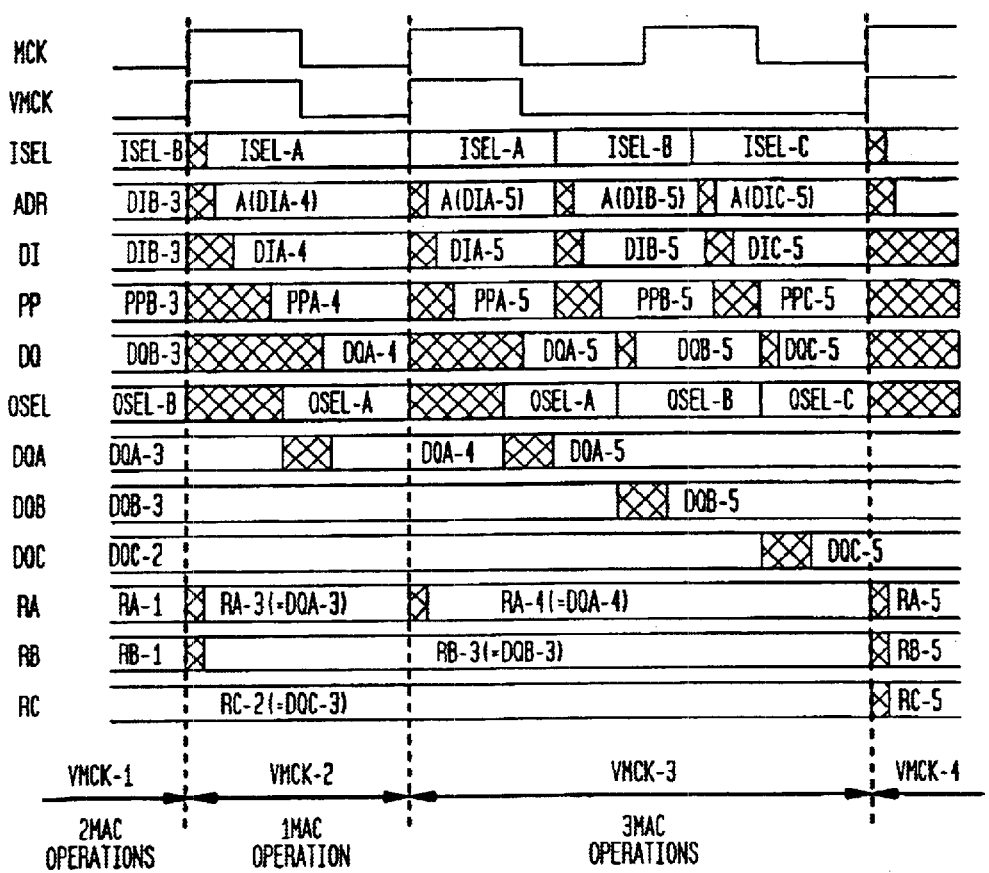
FIG. 9 is a timing diagram for a VMAC constructed in accordance with the present invention and adapted to execute a variable number of MAC operations for each system clock cycle.

The timing diagram of FIG. 9 represents operation of a VMAC 100 performing a mixed number of MAC operations per VMCK cycle. In this case, the frequency of the VMCK 102 varies with the number of MAC operations which need to be performed within each VMCK cycle. The CWG 110 changes the ISEL signal 182 according to the number of MAC operations it needs to complete. Again, since only the rising edge of the VMCK 102 is used as the VMAC 100 starting signal, the duty cycle of the VMCK does not need to be 50-50. The number of operand sets presented by the source register 160 is different from one VMCK cycle to another. However, the CWG 110 still changes the ISEL signal 182 as stage A (FIG. 5) completes its task with each set of operands, and the CWG 110 resets the ISEL signal 182 to ISEL-A with the rising edge of the VMCK 102. Within each VMCK cycle, the SCS-MAC 130 produces results serially according to the number of input operand sets. The output data demultiplexer 174 and register 176 parallelize the serial results, and assert DQs (e.g., DQA, DQB, etc.) on sets of physically different output wires. The result register 190 latches DQs with the next rising edge of the VMCK, and produces the VMAC results (RA, RB, etc.) at its output.

Figure 10:
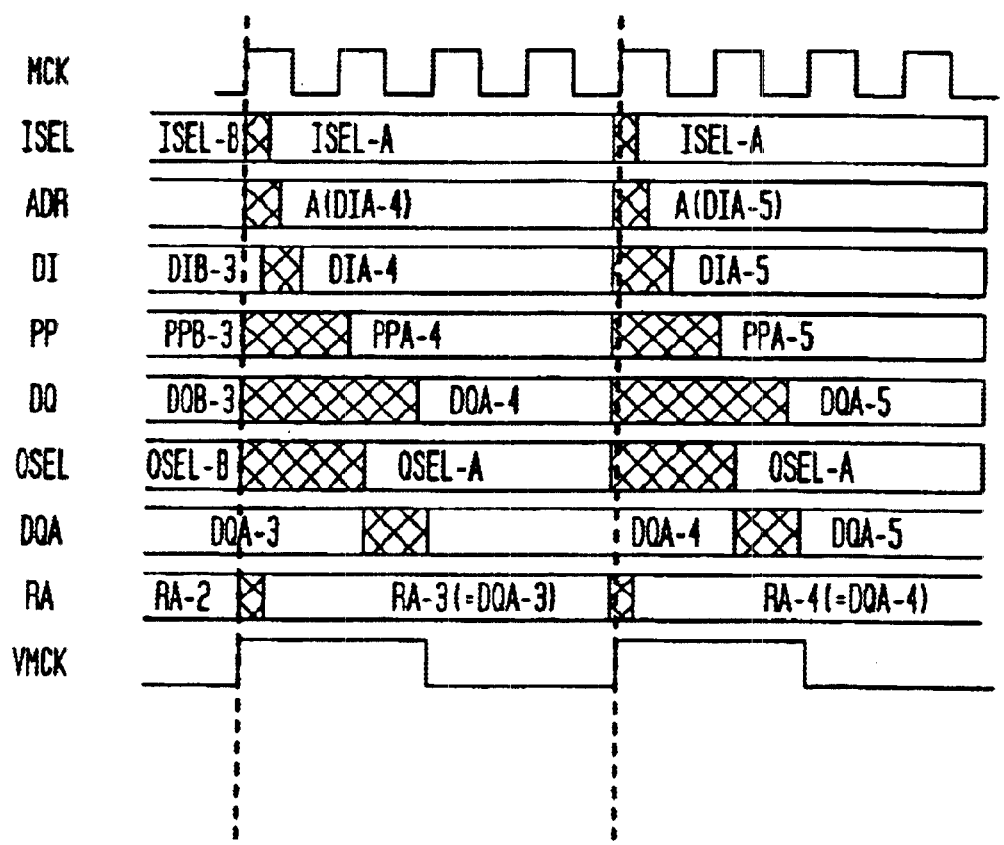
FIG. 10 is a timing diagram for a VMAC constructed in accordance with the present invention and adapted to execute a single MAC operation for a plurality of clock cycles.

With reference next to FIG. 10, a timing diagram of a VMAC 100 configured to complete less than one MAC operation per MCK cycle (i.e., to perform one MAC operation per every 4 MCK cycles) is there depicted. In this case, the VMCK frequency is one-quarter of the MCK frequency. The CWG 110 does not change the ISEL signal 182, and the throughput rate of VMAC 100 is one per every four MCK cycles. This timing diagram represents the case when the MCK 90 is much faster than the speed of the VMAC 100. This is a particularly interesting case because a VMAC 100 configured in accordance with the present invention does not limit the system operation speed. A done signal may be generated by the CWG 110 to indicate when a MAC operation has been completed.

The present invention permits dynamic variation of the number of MAC operations to be performed in a MCK cycle. It is thus desirable to provide a signal from the VMAC 100 to the CPU pipeline control logic when the VMAC has completed the requested number of MAC operations.

The present invention is directed to a VMAC 100 that performs variable MAC operations within a single system clock cycle. The VMAC 100 of the present invention may perform a fixed or variable number of MAC operations, as a routine matter of design choice. Thus, the present invention eliminates the duplicative, parallel MAC circuits and components required in prior art configurations and, as a result, achieves improvements in integrated circuit design and performance. More compact layout of integrated circuits including a VMAC may be provided, accompanied by a reduction in power consumption.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A virtually parallel multiplier-accumulator (VMAC) responsive to a VMAC clock (VMCK) derived from a master clock (MCK), said VMAC being adapted for performing more than one multiplier-accumulator (MAC) operation within a MCK cycle, said VMAC comprising:
    a control-wave generator (CWG) adapted for generating a plurality of control signals within a VMCK cycle; and
    a sequential-computational stage MAC (SCS-MAC) adapted for receiving data from a source register and for receiving said plurality of control signals from said CWG, said SCS-MAC performing an operation on said data upon receipt of each of said plurality of control signals from said CWG.

2. A VMAC as recited by claim 1, wherein said SCS-MAC comprises:
    a partial product generator (PPG) adapted for receiving a first data and a second data from a source register and for generating an output that is a product of said first and said second data; and
    a multi-stage partial product adder (PPA) adapted for receiving said PPG output and for receiving a third data, said PPA generating an output that is the sum of said PPG output and said third data.

3. A VMAC as recited by claim 2, wherein said PPA further comprises a plurality of serially arranged stages that define a data path through said PPA.

4. A VMAC as recited by claim 3, wherein each of said plurality of serially arranged stages receives an input from an immediately preceding stage and generates an output that is a partial sum of said input.

5. A VMAC as recited by claim 3, wherein each of said serially arranged stages defines a worst-case delay period, and wherein said CWG further comprises a delay data path that includes a plurality of delay stages, each of said plurality of delay stages defining a delay that is substantially the same as the delay of a corresponding serially arranged stage.

6. A VMAC as recited by claim 3, wherein said PPA comprises a dynamic carry save adder stage and a dynamic carry look ahead stage.

7. A VMAC as recited by claim 2, wherein said PPA further comprises a plurality of serially arranged stages, said PPG and each of said serially arranged stages separately performing an operation on said data, wherein flow of said data through said PPG and each of said serially arranged stages of said PPA is controlled by a control signal generated by said CWG.

8. A VMAC as recited by claim 1, wherein said VMAC is adapted for performing the same number of MAC operations within each MCK cycle.

9. A VMAC as recited by claim 1, wherein said VMAC is adapted for performing a different number of MAC operations within each MCK cycle.

10. An integrated circuit including a virtually parallel multiplier-accumulator (VMAC) responsive to a VMAC clock (VMCK) derived from a master clock (MCK), said VMAC being adapted for performing more than one multiplier-accumulator (MAC) operation within a MCK cycle, said integrated circuit comprising:
    a source register for providing data to said VMAC; and
    a result register for receiving data from said VMAC and for providing data to said source register;
    wherein said source register provides parallel data to said VMAC and wherein said VMAC provides serial data output, said integrated circuit further comprising an output data demultiplexer and a register for receiving said serial data output from said VMAC, for converting said serial data to parallel data, and for communicating said parallel data to said result register.

11. An integrated circuit as recited by claim 10, wherein said integrated circuit comprises a microprocessor.

12. An integrated circuit as recited by claim 11, wherein said VMAC comprises:

a control-wave generator (CWG) adapted for generating a plurality of control signals within a VMCK cycle; and a sequential-computational stage MAC (SCS-MAC) adapted for receiving data from a source register and for receiving said plurality of control signals from said CWG, said SCS-MAC performing an operation on said data upon receipt of each of said plurality of control signals from said CWG.

13. An integrated circuit as recited by claim 12, wherein said SCS-MAC comprises:

a partial product generator (PPG) adapted for receiving a first data and a second data from a source register and for generating an output that is a product of said first and said second data; and a multi-stage partial product adder (PPA) adapted for receiving said PPG output and for receiving a third data, said PPA generating an output that is the sum of said PPG output and said third data.

14. An integrated circuit as recited by claim 13, wherein said PPA further comprises a plurality of serially arranged stages, said PPG and each of said serially arranged stages separately performing an operation on said data, wherein flow of said data through said PPG and each of said serially arranged stages of said PPA is controlled by a control signal generated by said CWG.

15. An integrated circuit as recited by claim 10, wherein said integrated circuit comprises a digital signal processor.

16. An integrated circuit as recited by claim 10, wherein said VMAC is adapted for performing the same number of MAC operations within each MCK cycle.

17. An integrated circuit as recited by claim 10, wherein said VMAC is adapted for performing a different number of MAC operations within each MCK cycle.

18. A virtually parallel multiplier-accumulator (VMAC) responsive to a VMAC clock (VMCK) derived from a master clock (MCK), said VMAC being adapted for performing one of more than one multiplier-accumulator (MAC) operation within a MCK cycle, and less than one multiplier-accumulator (MAC) operation within a MCK cycle, said VMAC comprising:

a control-wave generator (CWG) adapted for generating a plurality of control signals in relation to a VMCK cycle; and a sequential-computational stage MAC (SCS-MAC) adapted for receiving data from a source register and for receiving said plurality of control signals from said CWG, said SCS-MAC performing an operation on said data upon receipt of each of said plurality of control signals from said CWG.

* * * * *